United States Patent [19]
Narang et al.

[11] Patent Number: 5,976,666

[45] Date of Patent: *Nov. 2, 1999

[54] ELECTROMAGNETIC RADIATION ABSORBING DEVICES AND ASSOCIATED METHODS OF MANUFACTURE AND USE

[75] Inventors: Subhash C. Narang; Asutosh Nigam; Sei-ichi Yokoi, all of Redwood City; Robert C. Schmitt, Palo Alto; Kenneth J. Harker, Los Altos; Mark A. McHenry, Menlo Park, all of Calif.

[73] Assignee: SRI International, Menlo Park, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/297,688

[22] Filed: Aug. 29, 1994

[51] Int. Cl.$^6$ .............................. B32B 3/24; H01Q 17/00
[52] U.S. Cl. .......................... 428/138; 428/137; 428/138; 342/1; 342/2; 342/3; 342/4; 174/35 MS
[58] Field of Search .................................... 428/137, 138; 342/1, 2, 3, 4; 174/35 MS

[56] References Cited

U.S. PATENT DOCUMENTS

| 2,599,944 | 6/1952 | Salisbury | 342/1 |
|---|---|---|---|
| 4,038,660 | 7/1977 | Connolly et al. | 343/18 A |
| 4,496,950 | 1/1985 | Hemming et al. | 343/18 A |
| 4,948,922 | 8/1990 | Varadan et al. | 174/35 GC |
| 5,081,455 | 1/1992 | Inui et al. | 342/1 |
| 5,103,231 | 4/1992 | Niioka | 342/1 |
| 5,117,229 | 5/1992 | Niioka | 342/1 |
| 5,208,599 | 5/1993 | Rudduck et al. | 342/4 |
| 5,214,432 | 5/1993 | Kasevich et al. | 342/3 |
| 5,223,849 | 6/1993 | Kasevich et al. | 343/895 |
| 5,439,978 | 8/1995 | Parkinson et al. | 525/185 |

FOREIGN PATENT DOCUMENTS

287092 A2 10/1988 European Pat. Off. .

OTHER PUBLICATIONS

Naito and Mizumoto, "Effect of Doping Carbon in an Electromagnetic Wave Absorber Rubber Ferrite" (1987) *Electronics and Communications in Japan Part 2*, 70(2):12–17.

Satyam, A., and Narang, S.C., "Improved Methods for the Synthesis of Polyethylene Glycols and Sulfur–Substituted Polyethylene Oxides" *Polymer Preprints*, American Chemical Society, Washington, D.C., meeting (Aug. 1992), p. 122.

Eccosorb SF Technical Data Sheet from Emerson & Cuming, 869 Washington Street, Canton Massachusetts 02021–9990.

G.T. Ruck, editor, *Radar Cross–Section Handbook*, Plenum Press, NY, (1970) II, (Chapter 8), pp. 539–540 and 611–640.

Hashimoto et al., "Lossy Electromagnetic Shielding Materials Using Ferrite and Resistive Materials"(1984) *Advances in Ceramics* 16:477–482).

*Primary Examiner*—William P. Watkins, III
*Attorney, Agent, or Firm*—Dianne E. Reed; Reed & Associates

[57] ABSTRACT

Novel devices for providing shielding from and absorption of broadband electromagnetic radiation, and methods of manufacturing and using these devices, are disclosed. The device is comprised of a perforated electrical absorbing layer, containing conductive polymers, laminated to a metal plate. Additional layers may be incorporated into the device including one or more additional layers of electrical absorbing layers, magnetic absorbing layers and impedance matching layers.

45 Claims, No Drawings

ELECTROMAGNETIC RADIATION ABSORBING DEVICES AND ASSOCIATED METHODS OF MANUFACTURE AND USE

TECHNICAL FIELD

The invention relates generally to electromagnetic radiation absorbing devices. In particular, the invention relates to dual-band multilayer electromagnetic radiation absorbing devices that provide a minimum of 15 dB absorption in the VHF, UHF and SHF bands. The invention additionally relates to methods of using the novel devices to shield target substrates from radiation, and to methods of fabricating the novel devices.

BACKGROUND

It is rapidly becoming a necessity to develop a means to avoid the multipath reflection of TV signals that produces ghosting of images. Ferrite tiles are presently used to control reflections of very high frequency (VHF) TV signals. However, future direct-broadcast satellite TV systems will use frequencies in the range of 10 to 30 GHz. Hence, in anticipation of the use of such systems, there is a need to develop means to attenuate reflections in both the VHF and microwave bands.

The concern to be addressed is how to provide absorption of electromagnetic (EM) radiation over an extremely wide bandwidth and range of incident angles. In the case of normal incidence, there are a variety of single- and multi-layer techniques for making good radiofrequency (RF) absorbers (Knott et al. (1985) *Radar Cross Section: Its Prediction, Measurement, and Reduction*, Artech House, Inc.; Naito and Mizumoto (1987) *Electronics and Communications in Japan Part 2*, 70(2):12–17; Hashimoto et al (1984) *Advances in Ceramics* 16:477–683), but all such techniques are effective only over limited bandwidths. Absorption over a broader bandwidth is obtained if the material is graded (i.e., if the material's absorption and wave-impedance properties change gradually away from free-space values as the wave penetrates the material). This approach is particularly attractive at microwave frequencies because the material's required thickness is not too great. On the other hand, synthesizing materials having exactly the right graded electromagnetic properties and producing them economically and in large quantities are generally difficult. Hence, this problem presents difficulties in both absorber design and material synthesis.

EM wave absorbers may be loosely classified as "resonant" or "broadband." Resonant absorbers derive their name from the fact that the conditions for reduction of reflected EM radiation are satisfied, in general, only at one or more discrete frequencies. On the other hand, broadband EM wave absorbers, in principal, provide absorption at all frequencies, but generally become ineffective outside a frequency band as a result of change in material properties with changing frequency. Practically, extant EM wave absorbers designed to cover a wide range of frequencies are generally made up of combinations of EM wave absorbing elements.

The design of broadband absorbers is essentially the design of a lossy matching network between free space and a conducting surface. Providing loss while minimizing reflection is the key in EM wave absorbing material application. Thus, a broadband EM wave absorber design must address two issues: how to promote propagation of incident waves into the material, rather than simply reflecting from the surface, and how to provide the required level of energy absorption once the wave is interior to the absorber.

Two of the oldest and simplest types of absorbers are represented by Salisbury screens and Dallenbach layers. The Salisbury screen (see, U.S. Pat. No. 2,599,944 to Salisbury) is a resonant absorber created by placing a resistive sheet on a low dielectric constant spacer in front of a metal plate. The Dallenbach layer consists of a homogeneous lossy layer backed by a metal plate (G. T. Ruck, editor, *Radar Cross-Section Handbook*, Vol. II, Chapter 8, Plenum Press, New York, 1970).

In an analysis of the Salisbury screen, it is assumed that an infinitesimally thin resistive sheet of conductance G, normalized to free space, is placed a distance d from a metal plate. Typically, a foam or honeycomb spacer might be used, so spacer dielectric constants in the 1.03 to 1.1 range are achieved. For zero reflectivity, a Salisbury screen requires 377 ohms per square resistance sheet set at an odd multiple of an electrical quarter-wavelength in front of a perfectly reflective backing.

For a screen with 0.5 inch spacing, the reflection coefficient reaches its minimum value (<−40 dB) at a frequency of 5.9 GHz ($\lambda$=2 inch). The best performance is obtained for a resistivity of 377 ohms per square, but the performance is still −18 dB reflectivity for a resistivity 20 percent lower (300 ohms per square). However, a resistivity of 200 ohms per square yields barely a −10 dB reflectivity level at the design spacing. The fractional bandwidth for the 377 ohms per square screen at −20 dB reflectivity level is about 25 percent. To achieve similar performance at a lower frequency, the spacing must be increased because the wavelength becomes longer.

The Salisbury screen has been used in varying degrees in commercial EM radiation absorbing materials. However, the rapid oscillations for large spacing would render it ineffective over a wide frequency range. For increased mechanical rigidity, plastics, honeycomb or higher density foams may be used as spacers. To maintain electrical spacing, the resistive sheet would be mounted over a dielectric layer trimmed to an electrical quarter-wavelength in thickness.

It is difficult to fabricate a thin single-layer type electromagnetic wave absorber for the SHF (3–30 GHz) band. Thus, much work has been done in extending the bandwidth of absorbers through the use of multiple layers. The motivation behind this approach is to change the effective impedance with distance into the material to minimize reflections. Two important types of multilayer absorbers are Jaumann absorbers and graded dielectric absorbers.

The bandwidth of a single layer Salisbury screen absorber can be improved by adding additional resistive sheets and spacers to form a Jaumann absorber. To provide maximum performance, the resistivity of the sheets should vary from a high value for the front sheet to a low value for the back. Even better performance is available for the Jaumann absorbers with more sheets, as illustrated by a six-layer absorber (U.S. Pat. No. 4,038,660 to Connolly et al.). A 0.14 inch spacing between layers with a spacer $\in$=1.03 was used. An average radar cross-section reduction of 30 dB was measured for this design over the range of 7 GHz through 15 GHz, with a minimum of 27 dB at 8 GHz.

As with the Jaumann absorber, where sheet resistance values are tapered to reduce reflection, a graded dielectric can be used to help match the impedance between free space and a perfect conductor. The optimum method for design of such an absorber would be to determine analytically the $\mu$ and $\in$ required as a function of distance into the material to limit reflection over a given frequency range, subject to incidence angle and thickness constraints. This general form of the problem does not currently have a theoretical or experimental solution.

Typically, practical graded dielectric absorbing materials are constructed of discrete layers, with properties changing from layer to layer. There are several commercially available multilayer carbon-loaded soft foams for broadband absorption. These broadband absorbers provide good absorption in the SHF band. Although commercially available carbon-loaded foams provide good absorption in SHF band, they do not possess required mechanical or thermal properties for particular, e.g., architectural, applications.

There are several commercially available ferrite-based absorbers. Although ferrites are known to show losses at higher frequencies (Hashimoto et al. (1984), supra), there are no ferrite materials, or combinations of ferrites, that can provide the desired performance over the wide frequency range of VHF, UHF and SHF.

There is at least one commercially known ferrite-resistive layer containing broadband absorbers, Eccosorb-UPF from Emerson and Cummings, that combines the low-frequency performance of sintered ferrite with higher frequency absorption capabilities of a lossy foam. This product is composed of a fully sintered ferrite underlayer and various carbon-loaded lossy elastomeric front layers. The sintered ferrite absorbs in the VHF and UHF ranges while the lossy plastic layer provides absorption in the SHF range. The fabrication of this product has been discontinued by Emerson and Cummings.

This product clearly demonstrates that the performance of ferrite absorbers (100 MHz to 1 GHz) and lossy dielectric layers on the top of ferrite layer attenuates the reflection of low frequency waves. However, the lossy foam is not practical for certain applications, e.g., architectural, because of its poor mechanical properties.

SUMMARY OF THE INVENTION

In one aspect of the invention, a novel electromagnetic radiation absorbing device useful to limit reflections of incident EM waves is provided.

In another aspect of the invention, an electromagnetic radiation absorbing device fabricated from a perforated electrical absorbing layer and a metal plate laminated to the electrical absorbing layer is provided. The primary advantages of the invention are that the claimed electromagnetic radiation absorbing devices attenuate reflections over a wide bandwidth, e.g., in both the VHF and microwave bands, and over a wide range of incident angles. In other embodiments, the claimed device further contains one or more additional electrical absorbing layers. In some cases, the claimed device additionally contains a magnetic absorbing layer, an impedance matching layer and/or a ceramic coating.

The claimed broadband electromagnetic wave absorbing device finds utility for providing shielding from electromagnetic radiation when interposed between a target and a source of radiation. For example, the claimed device finds utility as EM wave absorbing tiles that can be used for architectural interior and exterior applications.

DETAILED DESCRIPTION OF THE INVENTION

I. Definitions

Before describing the present invention in detail, it is to be understood that this invention is not limited to the particular polymeric materials, absorbing layer compositions, fabrication methods, or the like, as such may vary. It is also to be understood that the terminology used herein is for the purpose of describing particular embodiments only, and is not intended to be limiting.

It must also be noted that, as used in this specification and the appended claims, the singular forms "a", "an" and "the" include plural referents unless the content clearly dictates otherwise. Thus, for example, reference to "an electrical absorbing layer" includes more than one such layer, reference to "an antielectrostatic agent" includes mixtures of such agents, and the like.

In this specification and in the claims which follow, reference will be made to a number of terms which shall be defined to have the following meanings:

"Thermoplastic resins" are polymeric structures that soften or melt at elevated temperatures and that, when cooled, recover the physical and chemical properties of the original resin. "Thermoset resins", on the other hand, are polymeric structures that resist softening or melting at elevated temperatures. "Epoxy resins" are monomers or prepolymers, characterized by the presence of a three-membered cyclic ether group, that further react with curing agents to yield high performance thermosetting plastics.

The term "ferrite" is intended to describe a class of magnetic oxide compounds that contain iron oxide as a primary component and which possess the property of spontaneous magnetization (a magnetic induction in the absence of an external magnetic field).

The term "polymer" is intended to include both oligomeric and polymeric species, i.e., compounds which include two or more monomeric units, which may be a homopolymer or a copolymer. When a single generic structure is shown, e.g., as in formula (I), it is to be understood that the polymers described may contain two or more different monomeric units represented by the single generic structure. A "conductive polymer" is one which possesses conducting as opposed to insulating electrical-transport properties.

The term "homopolymer" is a polymer incorporating a single species of monomer units. The term "copolymer" is a polymer constructed from two or more chemically distinct species of monomer units in the same polymer chain. A "block copolymer" is a polymer which incorporates two or more segments of two or more distinct species of homopolymers or copolymers.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain 1 to 12 carbon atoms. The term "lower alkyl" intends an alkyl group of one to six carbon atoms.

The term "alkylene" as used herein refers to a difunctional saturated branched or unbranched hydrocarbon chain containing from 1 to 24 carbon atoms, and includes, for example, methylene ($-CH_2-$), ethylene ($-CH_2-CH_2-$), propylene ($-CH_2-CH_2-CH_2-$), 2-methylpropylene [$-CH_2-CH(CH_3)-CH_2-$], hexylene [$-(CH_2)_6-$] and the like. "Lower alkylene" refers to an alkylene group of one to six carbon atoms.

By a "graded" absorptive material or device is meant that the absorption and wave-impedance properties of the material or device change gradually away from free-space values as an electromagnetic wave penetrates the material.

The term "conductive" as used herein means that property of an agent which renders the agent unable to sustain the buildup of electrostatic charge.

II. The Novel Electromagnetic Radiation Absorbing Device

The electromagnetic radiation absorbing device of the invention is comprised of a perforated electrical absorbing layer and a metal plate laminated thereto. The electrical absorbing layer is fabricated from first and second polymeric materials. The first polymeric material is a thermoplastic or thermoset resin, e.g., Nylon 12, polyester, polystyrene, silicone rubber, a fluorinated elastomer, an epoxy, or the like. The second polymeric material is a conductive agent selected from among the following polymeric formulations, as described in commonly assigned co-pending U.S. application Ser. No. 08/104,216 to Parkinson et al., filed Aug. 9, 1993, now U.S. Pat. No. 5,439,978 the disclosure of which is hereby incorporated by reference.

The first such polymeric formulation is a block copolymer which contains a first block of polyoxazoline, polyoxazine, or a combination thereof, generally formulated from monomeric species having the general structure (I)

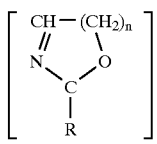

(I)

wherein n is 1 or 2, and R is selected from the group consisting of hydrogen and a $C_1$–$C_{40}$ side chain, wherein the side chain is a linear or branched aliphatic hydrocarbon radical optionally containing 1 to 3 ether, imine and/or sulfide linkages, an alicyclic or aromatic hydrocarbon radical, a polyethylene imine, a polyethylene oxide, a polythioether, i.e., a moiety containing recurring —($CH_2CH_2NH$)—, —($CH_2CH_2O$)— or —(($CH_2$)$_n$—S)— units, respectively, or a thioether linkage-containing polyalkylene glycol, and a second block of a thioether linkage-containing polyalkylene glycol. The polyalkylene glycols useful in synthesizing the thioether linkage-containing polyalkylene glycol blocks of the copolymers are well known in the art and are formulated from monomer units having the general structure

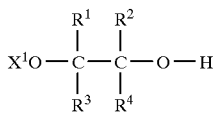

(II)

wherein $R^1$, $R^2$, $R^3$ and $R^4$ are independently selected from the group consisting of H and $C_1$ to $C_{12}$ linear, branched or cyclic alkyl, with the proviso that at least one of $R^1$, $R^2$, $R^3$ and $R^4$ is other than H. Preferred hydrocarbon radical substituents are $CH_3$—, $CH_3CH_2$— and $CH_3CH_2CH_2$—. $X^1$ is preferably H but may be a linear or branched hydrocarbon radical, typically alkyl, more typically lower alkyl. The polymers deriving from these monomers thus comprise recurring mer units having the structure

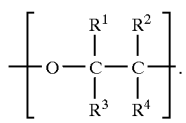

The second such polymeric formulation is a block copolymer which contains a first block which is selected from the group consisting of polyoxazine, polyoxazoline, and combinations thereof, generally formulated from the monomer reactant species having the general structure (I), as shown above, and a second block comprising monomer units having the structure

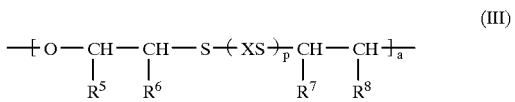

(III)

wherein $R^5$, $R^6$, $R^7$ and $R^8$ are independently selected from the group consisting of hydrogen and lower alkyl, X is —$R^m$—(Z)$_f$—$R^n$— wherein $R^m$ and $R^n$ are branched or linear lower alkylene, Z is O or S, and 1 is 0 or 1; preferably, X is selected from the group consisting of —$C_2H_4$—, —$C_4H_8$—, —$C_2H_4$—O —$C_2H_4$—, —$C_2H_4$—S—$C_2H_4$— and —$C_2H_4$—S—$CH_2$—$C(CH_3)H$—. Typically, although not necessarily, "a" is selected to provide the copolymer with a molecular weight in the range of about 500 to 50,000, but is preferably an integer in the range of 2 to 40, inclusive, and p is 0 or 1. The monomer units of the first and second blocks may be the same or different. The polythioethers and methods of synthesis thereof have been disclosed in U.S. Pat. No. 4,366,307 to Singh et al., which is hereby incorporated by reference.

Preferably, these block copolymers are A-B-A block copolymers, wherein A represents polyoxazoline, polyoxazine, or a combination thereof, and the B block represents a polythioether or thioether linkage-containing polyoxyalkylene block. More preferably, the A block is a polyoxazoline. Although the molecular weight of the copolymer may vary, it is preferably between about 500 and 50,000, more preferably between about 1,000 and 50,000 and most preferably between about 2,000 and 10,000. The overall ratio of A block to B block is in the range of about 1:1 to 100:1 and preferably is between about 20:1 and 80:1.

The third such polymeric formulation is a polymer formulated from a monomeric species having the structure (IV)

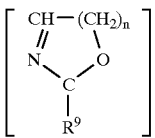

(IV)

wherein n is 1 or 2, and $R^9$ is selected from the group consisting of polyethylene imine, polyethylene oxide, polythioether, and thioether linkage-containing polyalkylene glycols or combinations thereof. As with the substituent R defined earlier herein, it is preferred that $R^9$ contain 1 to 40, preferably 1 to 20, carbon atoms.

The fourth such polymeric formulation is a copolymer formulated from the monomeric reactant species shown in structure (I) above, and a second species comprising an amine-terminated polyethylene oxide. Such polymers are of the "AB" type and have a molecular weight, with the ratio of the A block to the B block in the range of about 20:1 to 1:20.

It should be noted that, in summary, all of the polymers of which the second polymeric species may be comprised involve oxazoline and/or oxazine units with a side chain R (or $R^9$) having not more than about 40, preferably not more than about 20, carbon atoms. It should also be noted that all polymers of the invention typically have molecular weights in the range of about 500 to 500,000, preferably in the range of about between about 1,000 and 50,000, and most preferably between about 2,000 and 10,000.

Oxazoline and oxazine monomers, i.e., structures (I) and (IV), of which each of the above four polymeric formulations is at least in part constructed, may be synthesized by any known method in the art, including dehydrohalogenation of haloamides, dehydration of hydroxyamides, reaction of nitriles with epoxides or reaction of ethyl imidate with aminoalkyl alcohols, isomerization of N-acylaziridines, cyclization of hydroxyalkyl isocyanides, reaction of nitrites or carboxylic acids with aminoalkyl alcohols, or the like. Such methods are reviewed by S. Kobayashi, *Prog. Polym. Sci.* 15:751–783 (1990).

One example of the latter synthetic method involves synthesis of polyethylene imine, polyethylene oxide, polythioether and thioether linkage-containing polyalkylene glycol side chain-containing polyoxazolines or polyoxazines from precursors as illustrated in Scheme I Scheme I

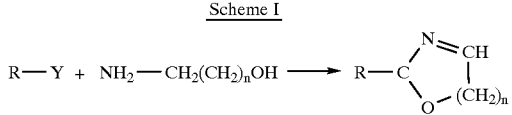

wherein R (or $R^9$) is as defined earlier herein, and Y is CN or COOH.

Polyethylene imines, polyethylene oxides, polythioethers and thioether linkage-containing polyalkylene glycols from which the oxazoline and/or oxazine monomers with side chain R (or $R^9$) are synthesized may be obtained as follows. Polythioethers useful in the claimed invention may be obtained commercially or by a variety of synthetic methods well known in the art. See, U.S. Pat. No. 4,366,307 to Singh et al. Similarly, polyethylene imine may be obtained commercially, e.g., from BASF (Clifton, N.J.). Polyethylene oxides are commercially available from Fluka Chemical Corp. (Ronkonkoma, N.Y.) and Aldrich Chemical Co. (Milwaukee, Wis.).

Thioether linkage-containing polyalkylene glycols may be obtained commercially or by a variety of synthetic methods. Examples of commercially available thioether linkage-containing polyalkylene glycols include Permapol® P-900 (MW=500) and Permapol® P-905 (MW=1000) (Products Research & Chemical Corp., Glendale, Calif.). Permapol® 900 (MW=500) is a diol, and Permapol® 905 (MW=1000) is a triol, of Permapol® P-3 polythioether which contains recurring units having the following basic structure

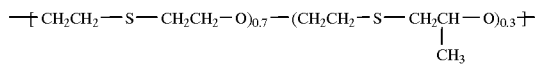

Synthetic methods by which thioether linkage-containing polyalkylene glycols may be obtained may be found in Inoue, S., and Aida, T., *Ring-Opening Polymerization* Vol. 1, Chapter 4, pp.; 185–298, Elsevier, 1984.

Synthesis of the copolymer containing polyoxyalkylene or polythioether blocks (formulations 1 and 2) involves reaction of the polymer of the first block with a polyalkylene glycol of the general formula

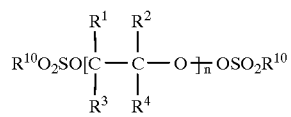

or a sulfonate ester-terminated polythioether of the general formula

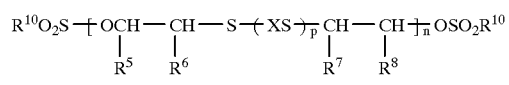

wherein $R^1$, $R^2$, $R^3$, $R^4$, $R^5$, $R^6$, $R^7$, $R^8$, X and p are as defined above. $R^{10}$ may be any alkyl, haloalkyl, aryl, or substituted aryl group which makes the sulfonate ester terminating group an effective initiator of the polymerization reaction. $R^{10}$ is preferably $CH_3C_6H_5$—.

Any method known in the art may be used to synthesize the polyalkylene glycol or sulfonate ester-terminated polythioether. One method is to react a polyalkylene glycol or polythioether with a sulfonyl halide, for example tosyl chloride, in the presence of a tertiary amine such as pyridine. The formed amine hydrohalide salt is then removed from the desired sulfonate ester-terminated polythioether or polyalkylene glycol. A second method is to react a polythioether or polyalkylene glycol with a sulfonyl halide in aqueous solution under basic conditions followed by extraction and drying to yield the desired polyalkylene glycol or sulfonate ester-terminated polythioether. Any suitable synthetic method may be used to obtain the block copolymer from these precursors.

For example, in one preferred method of block copolymer synthesis, oxazine or oxazoline monomers are reacted with the polyalkylene glycol or sulfonate ester-terminated polythioether in a sealed tube at a temperature between about 25° C. and 250° C. Temperatures between 100° C. and 200° C. are preferred to minimize reaction times and potential side product formation. In this temperature range, a reaction time of about 1 hr to 100 hr will be sufficient. Any suitable method may be used to separate the block copolymer produced, for example, ion exchange chromatography or size exclusion chromatography. One convenient method is to precipitate the desired copolymer from the reaction mixture in an solvent in which the copolymer is not soluble, for example, preferably diethyl ether, and drying the product thus produced.

Synthesis of polyoxazolines or polyoxazines which contain polyethylene imine, polyethylene oxide, polythioether or thioether linkage-containing polyalkylene glycol pendant chains (formulation 3) can be effected by any polymerization process known in the art, for example, ring opening polymerization, using a monomer unit of the general formula (I) or (IV) as described above.

Ring opening polymerization may be effected by the following general synthetic scheme Scheme II

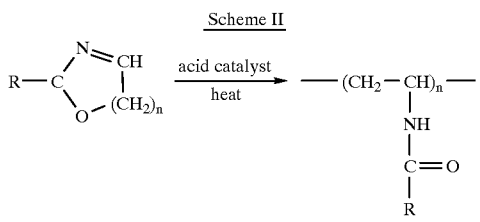

Thus, the oxazine and oxazoline monomer units as present in polymerized form have the structure shown at the right side of Scheme II.

Copolymers of oxazolines, oxazines, or combinations thereof, and polyethylene imine, amine-terminated polyethylene oxide, polythioethers or thioether linkage-containing polyalkylene glycols, or mixtures thereof (formulation 1, 2, or 4) may be synthesized using a similar ring opening polymerization as shown in Scheme II. Polyethylene imines, polyethylene oxides, polythioethers and thioether linkage-containing polyalkylene glycols, or mixtures thereof, are reacted stoichiometrically in the presence of an acid catalyst at elevated temperatures with the monomeric species shown in structures (II) or (IV).

Conductive composites of Nylon 12 or other suitable synthetic substrates, such as polyester, polystyrene, silicon rubbers, fluorinated elastomers, epoxies, or the like, may be made by melting the substrate in a preheated mixing device capable of providing high shear mixing and combining therein a polymer of the above-described formulation. In addition, a block copolymer of oxazine, oxazoline, or combinations thereof, and polyalkylene glycol, may be used. A preferred method of manufacture is to first combine a polymer with a plasticizer, preferably Jeffamine® (Texaco) (polyoxyalkyleneamine) and a carbon powder in an organic solvent, for example, petroleum naphtha. This mixture is then heated at temperatures between about 100° C. and 250° C. for a duration of between about 1 to 25 hr after which the solvent is removed and the product recovered. This product is then melted by combining with the melted substrate and mixing in a device capable of high shear mixing. At this point, a conductive polymeric formulation as described above may be added to the mixture, as may plasticizer and/or carbon powder. Furthermore, conductive materials may be added to the electrical absorbing layer composition, such as carbon, conductive polymers, metal powders, metal fibers, and the like, so as to provide the electrical absorbing layer with a resistivity of less than about $10^{10}$ ohm.cm. Examples of such conductive polymers include polypyrroles, polyanilines, polyisothionaphthenes, polythiophenes, and the like, which may or may not be substituted with carboxylate substituents. The final conductive composite product may be recovered after further mixing at between about 100° C. and 250° C. for between about 5 and 120 min.

The electrical absorbing layer fabricated from the above-described composites contains a plurality of perforations which applicants have discovered reduce to the lowest possible level the energy reflected back from an incident wave by a dielectric absorber. The size and placement of the perforations have been determined with a specially developed computer program, "SLAB", based on the spectral domain method of Scott ((1989) *The Spectral Domain Method in Electromagnetics,* Artech House, Inc.). The properties of the exemplary case analyzed are as follows. The layers of the absorber are broken up into horizontal slabs. Each slab is discretized into periodic unit cells. These cells are in turn broken into square patches with the thickness and the sides of each patch chosen so that they are less than 0.1 of the local wavelength. The absorber periodic unit cell has translational symmetry in the x and y directions, and reflection symmetry about the x and y axes and the diagonals intersecting these axes. In addition, the incident wave is assumed to be normal to the absorber unit.

The governing equations are the electric field integral equation:

$$E(r) - E_i(r) = -j\omega\mu_0\left[1 + \frac{1}{k^2}\nabla\nabla\cdot\right]A(r) \quad (1)$$

where $$A(r) = \int G(r,r')J(r')dr' \quad (2)$$

is a vector potential, $$G(r, r') = \frac{e^{-jk|r-r'|}}{4\pi|r-r'|} \quad (3)$$

is the Green's function, r and r' are the coordinates of the field and source points, respectively, ω is the angular frequency, and $\mu_0$ is the vacuum permeability. Equation (1) specifies the total electric field point, E, as the sum of the incident field, $E_i$, at that point plus an integral over the currents in the body, J, at the source points. In dielectric regions the full equation is applied, while in the metallic regions the same equation is applied with the total electric field set to zero. In regions devoid of matter, the null current equation $$J(r) = 0 \quad (4)$$

is applied, i.e., simply a statement that the current density is zero.

Incident upon the structure is an incident wave of the form $$E_i = E_{i0}e^{jkz} \quad (5)$$

Because both the absorber and the incident wave have the translational and unit cell reflection symmetries discussed above, both the fields and the current densities can be expanded in a special cosine Floquet harmonic series. For the current density, this series has the form $$J = \sum_{m=o}^{\infty}\sum_{n=0}^{\infty} J_{lmn}(z_l)\cos\frac{\pi m x}{h}\cos\frac{\pi n y}{h} \quad (6)$$

and the electric fields have an analogous form. Here $J_{lmn}(Z_l)$ is the Floquet current density coefficient at layer l of the body, m and n are the x and y Floquet indices, and 2h is the periodicity in the x and y directions. Substituting these expansions into the electric field integral equation and the null current equation, and then carrying out the integrations in the integral of the former equation, yields a set of coupled equations in x and y. Each equation is then integrated over x and y for each square patch. A set of coupled equations is obtained in the Floquet current density expansion at each level:

$$\sum_{l'w'mn} A^{lwp}_{l'w'mn} J_{l'w'mn} = R^{lwp}. \qquad (7)$$

Unprimed subscripts in Equation (7) refer to the field point, while primed subscripts refer to the source points. Subscript w in Equation (7) refers to the direction (x, y and z), p denotes the patch, and $J_{l'w'mn}$ are the w' components of the Floquet coefficients of Equation (6).

The right hand components in Equation (7) are given by $$R^{lwp} = E_{iw} e^{jkz_l} S_{00p}$$

for metal, $$R^{lwp} = j\omega \in_0 (\in -1) E_{iw} e^{jkz_l} S_{00p}$$

for dielectric, and $$R^{lwp} = 0 \qquad (8)$$

for void, where $$S_{00p} = \int_p dx\, dy \qquad (9)$$

and $\in$ and $\in_0$ are the relative and vacuum permitivities. The matrix elements $A_{l'w'mn}$ depend upon the material at the field and source points. Where both the field and source points are located in dielectric, $$A^{lwp}_{l'w'mn} = (1 + I_{mn}) \sum_{m'=\pm m} \sum_{n'=\pm n} \left[ \frac{j(\varepsilon - 1)}{8} \beta_{ll'ww'm'n'} \frac{e^{-j(z_l - z_{l'})k_{zmn}}}{k_{zmn}} + \frac{1}{4\Delta z} \delta_{ll'} \delta_{ww'} \right] S_{m'n'p}. \qquad (10)$$

In this equation $$k_m = \frac{\pi m}{h} \quad k_{zmn} = [k^2 - k_m^2 - k_n^2]^{\frac{1}{2}} \qquad (11)$$

$$\beta_{ww'll'mn} = \qquad (12)$$

$$\begin{vmatrix} k^2 - k_m^2 & -k_m k_n & -sn(z_{l'} - z_l)k_m k_{zmn} \\ -k_m k_n & k^2 - k_n^2 & -sn(z_{l'} - z_l)k_n k_{zmn} \\ -sn(z_{l'} - z_l)k_m k_{zmn} & -sn(z_{l'} - z_l)k_n k_{zmn} & k^2 - k_{zmn}^2 \end{vmatrix}$$

where rows are labeled by w and columns by w', sn equals −1, 0 and 1 for negative, zero, and positive arguments, respectively, and $$S_{mnp} = \int_p e^{j(k_m x + k_n y)} dx\, dy \qquad (13)$$

is integrated over patch p. In Equation (10), $I_{mn}$ is the operator interchanging m and n, $\Delta z$ is the layer thickness, and $\delta_{ll'}$ is 1 or 0, depending on whether l=l' or not. There are different forms for Equation (10) for other combinations of dielectric, metal and void at the field and source points. Equation (10) is a matrix equation for the Floquet current density expansion coefficients. Solution of this matrix equation gives the coefficients and thus the current density.

Substitution of Equation (6) into Equation (1) and integration of the integral terms are intermediate steps in obtaining Equation (7). These two steps yield the formula for the scattered field as a function of the Floquet current density coefficients. For lowest order (m=n=0) this formula yields expressions for the lowest order scattered fields, $E_{sx00}$ and $E_{sy00}$, in the form $$E_{sx00} = -\frac{\omega \mu_0}{2k} \sum_l J_{lx00} \qquad (14)$$

$$E_{sy00} = -\frac{\omega \mu_0}{2k} \sum_l J_{ly00}. \qquad (15)$$

The corresponding reflection coefficients are then given by $$R = \frac{E_{sx00}}{E_{i0x}} \text{ or } \frac{E_{sy00}}{E_{i0y}}. \qquad (16)$$

If $E_i$ is polarized in the x-direction, Equation (14) is used, otherwise Equation (15) is used. Similar expressions for higher order values of m and n (i.e., higher order grating lobes) can readily be derived.

SLAB was used in conjunction with the nonlinear simplex minimization method of Nelder et al.(1965) *Computer Journal* 7:308. The average scattered power samples at 1 GHz intervals over the frequency band between 2 and 8 GHz was minimized with respect to perforation size. Since spatial sampling must be performed over no greater than 0.1 wavelength intervals, an upper limit of 8 GHz, 5 cm total absorber thickness, and a period of 2.5 cm could not be exceeded. Comparison calculations show that improvements of −5 dB reflection loss was obtained by adding perforations to the absorber slab.

The perforations may or may not extend completely through the cross-section of the electrical absorbing layer. The perforation size, shape and distribution are optimized for maximum absorption. Thus, the perforation cross-sectional area may be as large as desired, but its diameter should be less than the unit cell periodicity in order to maintain structural integrity of the layer. Preferably, the cross-sectional area of the perforations is approximately $7.85 \times 10^{-3}$ cm² (diameter=0.1 cm) to approximately 78.5 cm² (diameter=10.0 cm), or larger depending on the size of the layer. The cross-sectional shape of the perforations may be circular, ovoid, square, triangular, rectangular, cruciform, X-shaped, or any other multisided configuration. The perforations may or may not be tapered in either direction. Further, the perforations may be periodically or aperiodically distributed in the electrical absorbing layer.

The metal plate which forms the inner surface of the electromagnetic radiation absorbing device and to which the electrical absorbing layer may be attached may be any metal which is reflective to electromagnetic radiation and which provides sufficient support for the absorbing layer. For example, these criteria may generally be satisfied by a metal plate comprised of carbon, low alloy steels, stainless steels, iron, nickel, Cr—Mo steels, aluminum, tantulum, titanium, copper, or the like.

In an alternate embodiment, the electromagnetic radiation absorbing device of the invention contains more than one electrical absorbing layer. A multiple electrical absorbing layer device may be formulated such that the dielectric constant ($\in$) of each layer is varied to form a graded resistive structure. The graduation of the dielectric constant may be increasing or decreasing from the exterior facing electrical absorbing layer to interior layers. Thus, the conductive polymeric blends described above may be formulated differently for each electrical absorbing layer in a multilayer device. For example, the first through fourth layers of a five layer device may be used to provide impedance matching (discussed in greater detail below) while the fifth layer is used as the absorbing layer.

The dielectric constant of each of the electrical absorbing layers may be adjusted by including perforations in the layer. The perforations in each layer may or may not extend through the cross-section of each layer. The perforations may be the same or different size, shape or periodicity in each layer. Furthermore, the perforations in each layer may or may not be tapered in either direction. When the perforations extend through the cross-section of a layer, they may be aligned with or offset from the perforations in the remaining electrical absorbing layers. The cross-sectional area of the perforations may be graduated in either direction from one layer to the remaining layers.

The electromagnetic radiation absorbing device of the invention, in addition to one or more electrical absorbing layer, may contain at least one magnetic absorbing layer interposed between the electrical absorbing layer(s) and the metal plate. The magnetic absorbing layer may be constituted of a ferrite-based material, to provide electromagnetic radiation absorbing capability, and may also include concrete for structural support. The ferrite-based composition may be a homogeneous- or mixed-ferrite composition. When multiple magnetic layers are used, each layer may be comprised of homogeneous- or mixed-ferrite composition to take advantage of absorption properties to tailor performance to a particular application. For materials such as hexagonal ferrites in which the frequency at which $\mu r'$ peaks can be controlled by doping, matched layers over difference frequency ranges can be produced. Alternatively, different magnetic materials can be layered to optimize use of the properties of each.

The natural ferrimagnetic resonant frequency of a hexagonal ferrite can be controlled by replacement of a portion of the Fe(III) ions in the lattice by divalent and tetravalent ions such as Co(III) and Ti(IV). Thus, magnetic absorbing layers can be constructed with different layers displaying different magnetic resonance frequencies. Examples of commercially available magnetic absorbers include BSF547, a manganese-zinc ferrite, KN320, a Ni—Zn ferrite and MAT305, a magnetite, all of are manufactured by Toda Kogyo Corporation. Composites of these magnetic powders with concrete can be fabricated. The composite can contain between approximately 10 wt. % to 100 wt. % magnetic powder, preferably 10 wt. % to 30 wt. %. Homogenous or mixed ferrite composites can be formulated at different concentrations or ratios, respectively.

The electromagnetic radiation absorbing device may contain, in addition to at least one electrical absorbing layer and, optionally, one or more magnetic absorbing layer, an impedance matching layer laminated to the electrical absorbing layer and forming the outer, radiation-contacting surface of the device. As with the electrical and magnetic layers, the impedance matching layer may be comprised of one or more layers. The electromagnetic radiation absorbing device of the invention provides high absorption if an impedance matching layer with a dielectric constant lower than the electrical absorbing layers is used as a front layer.

The impedance matching layer is preferably comprised of porous plastic, porous ceramic or porous concrete-type material (e.g., portland type I–II; Basalite). Plastic materials such as porous polypropylene or polyurethane or ceramic materials such as metal oxides, metal nitrides, metal carbides or mixed metal oxides, nitrides or carbides may be used in fabricating the impedance matching layer.

The impedance matching layer may further include carbon. Typically, 5% carbon is used in an impedance matching layer; however, a 100% carbon sheet may also be so employed.

In order to provide protection against the elements in exterior applications of the instant invention, the exposed face of the device may be provided with a ceramic coating. The ceramic coating may be any ceramic material, for example, metal oxides, nitrides and carbides or mixed metal oxides, nitrides and carbides.

The electromagnetic radiation absorbing device may be used as a broadband absorbing device interposed between the source of electromagnetic radiation and a target thereof. Thus, the instant invention will find utility in architectural applications to avoid multipath reflection of TV signals that produces ghosting of images. The different layers of the device may be selected so as to provide absorption over a desired wavelength of electromagnetic radiation.

III. Fabrication of the device

Fabrication of the electrical absorbing layer typically involves mixing the synthetic substrate, the plasticizer and a carbon powder, and other desired components, at approximately 220° C. to 270° C. for 20 min, removing the mixture while hot and thereafter making flakes therefrom with a grinder. The flakes are pressed and molded into, for example, a 12 inch by 12 inch tile form, at about 200° C. to 210° C. at 2000 psi. About one hour at this temperature is allowed for the flakes to melt and the melted flakes are maintained at a similar elevated temperature for an additional hour. The molten mixture is allowed to cool to approximately 95° C. to 100° C. such that the temperature differential between the top and bottom surfaces of the tile is within 5° C. to 10° C. The tile may then be perforated by any suitable means, e.g., punching, drilling, machining, or the like.

The magnetic absorbing layer may be fabricated by mixing ferrite powder (Toda Kogyo Corporation), cement powder (typically, portland type I–II; Basalite), an air entraining reagent (foam liquid concentrate; The Mearl Corp., New York), and water. The components are mixed with a paddle mixer for about 20 to 30 min after which the mixture is cast in a polyethylene terephthalate (PET) film frame of appropriate dimensions. The mixture is allowed to dry at room temperature.

Layers may be bonded together mechanically using, for example, screws, tapes, or the like, or with conductive or non-conductive adhesives.

In sum, the novel electromagnetic absorbing devices of the invention provide significant advantages such as broadband and wide incident angle electromagnetic radiation absorption. The novel devices also possess improved mechanical properties, are manufactured from readily available starting materials, and have enhanced electromagnetic radiation absorbing properties and flexibility as a result of the multilayer structure.

The following examples are intended to provide those of ordinary skill in the art with a complete disclosure and description of how to make and use the novel electromagnetic radiation absorbing device of the invention, and are not intended to limit the scope of what the inventors regard as their invention in any way. Efforts have been made to ensure accuracy with respect to numbers used (e.g., amounts, temperatures, etc.), but some experimental error and deviation should, of course, be allowed for. Unless otherwise indicated, parts are parts by weight, temperatures are in degrees celsius, and pressure is at or near atmospheric.

Example 1

Preparation of Block Copolymers of Thioglycol Bistosylate and 2-Ethyl-2-oxazoline (a) Synthesis of bistosylate of thioglycols: Bistosylates of two sulfur-containing (or thioether linkage-containing) polyglycols, (1) Permapol® P-900 (Products Research & Chemical Corp., Glendale, Calif.), and (2) Permapol® P-905 (Products Research & Chemical Corp., Glendale, Calif.), were synthesized. Two reported procedures were followed for the synthesis. See, U.S. Pat. No. 4,366,307 to Singh et al.; Satyam, A., and Narang, S. C., *Polymer Preprints,* American Chemical Society, Washington, D.C., meeting (August 1992), page 122.

Method A: Tosyl chloride (114 g; Aldrich, Milwaukee, Wis.) was added to a stirred solution of Permapol® P-900 (molecular weight 500) (100 g) in 500 mL of pyridine under cooling with ice, and the mixture was stirred for 4 hours at the same temperature. After precipitation of pyridinium hydrochloride salt, the reaction mixture was further stirred at room temperature for 72 hours, and then poured into 500 mL of iced water. The product was extracted with chloroform (3×500 mL). The extract was washed five times with water (1 L×5), dried over magnesium sulfate, and evaporated to yield bistosylate of Permapol® P-900 as a heavy oil.

Method B: Sodium hydroxide (30 g) was dissolved in 200 Ml of water. To this solution was added tosyl chloride (57 g) and Permapol® P-905 (100 g, molecular weight 1000). The reaction mixture was stirred for 14 hours at room temperature. The reaction mixture was extracted with chloroform (3×500 mL), dried over magnesium sulfate and filtered. The chloroform was then evaporated to yield bistosylate of Permapol® P-900 as a heavy viscous oil.

Synthesis of the desired bistosylate by either Method A or Method B was confirmed by IR and NMR.

(b) Two block copolymers of 2-ethyl-2-oxazoline were then synthesized using the bistosylate of Permapol® P-900 synthesized in the preceding section.

Polymer 1: 2-Ethyl-2-oxazoline (20 mL; Aldrich) and bistosylate of Permapol® P-900 (5 g) were dissolved in 60 mL of acetonitrile. The mixture was placed in a glass tube, and the tube was then sealed. The sealed glass tube was immersed in a preheated oil bath (110° C.). The reaction was carried out for 18 hours at 110° C. After 18 hours, the tube was taken out of the oil bath and allowed to come to room temperature. It was then carefully broken and the reaction mixture poured into diethyl ether (200 mL). The precipitate was filtered and dried to provide the desired block copolymer.

Polymer 2: 2-Ethyl-2-oxazoline (40 mL) and bistosylate of Permapol® P-905 (16.5 g) were dissolved in 60 mL of acetonitrile. The mixture was placed in a glass tube and the tube was sealed. The sealed glass tube was immersed in a preheated oil bath (110° C.). The reaction was carried out for 18 hours at 110° C. After 18 hours, the tube was taken out of the oil bath and allowed to come to room temperature. It was then carefully broken and the reaction mixture poured into diethyl ether (200 mL). As before, the precipitate was filtered and dried to provide the desired block copolymer. The block copolymers were characterized by NMR.

Example 2

Preparation of Nylon 12 and Polythioether-Carbon Composites

The block copolymers prepared in the preceding Example were used to prepare a Nylon 12 composite as follows. The copolymers, or, for comparison purposes, other polymers, such as Permapol® P-905 or Polybrene® (Aldrich), carbon powder XC72R were mixed in petroleum naphtha (150 cc, Union Oil), either in the presence or absence of Jeffamine® ED2001 or ED6000. The Jeffamine® ED-series materials are polyether diamines based on a polyethylene oxide backbone. Jeffamine® ED2001 has a molecular weight of approximately 2000. Jeffamine® ED6000 has a molecular weight of approximately 6000. The amounts of each component are shown in Table 1. The mixture was heated to 180° C. and the heat treatment was continued for 6 hours at this temperature. After heat treatment, the solvent was removed and a black solid mixture was recovered.

Nylon 12 (Atochem, Birdsboro, Pa.), in amounts shown in Table 1, was placed in a preheated (180° C.) Brabender mixer bowl and allowed to melt with high shear mixing. Once the Nylon 12 was melted, the black solid mixture obtained in the preceding step (8.0 g) was added and allowed to melt with high shear mixing. Finally, carbon XC72R (8.0 g) was added and the mixing was continued at 180° C. to 200° C. for 20 more minutes. The bowl was then opened and the desired composite product was recovered.

The electrical conductivity of the composite was measured using a Hiresta IP High Resistance Resistivity Meter (Mitsubishi Petrochemical Co., Inc., Tokyo) according to the manufacturer's instructions, and the values obtained for surface and volume resistivities are shown in Table 1. For comparative purposes, surface resistivities of an ethylene oxide/propylene oxide random copolymer incorporated into a semirigid PVC injection molding compound can be $10^{12}$ ohm/sq (see, European Patent Publication No. 287,092).

Example 3

Preparation of Composites Containing a Conductive Polymer

The block copolymer prepared in Example 1 was used to prepare a Nylon 12 composite containing a conductive polymer using the method described in Example 2. The conductive polymer, polypyrrole, was added to the mixture of copolymer and carbon powder in the amounts shown in Table 1. The electrical conductivity of the composite was measured as described in Example 2 and the values obtained for surface and volume resistivities are shown in Table 1.

Example 4

Preparation of Nylon 12 and Polyethyl Oxazoline-Carbon Composites

The methods described in Example 2 were used to make composites using polyethyl oxazoline (MW=50,000) instead of a polythioether copolymer. In some composite formulations, N-methyl pyrrolidone was mixed along with the polymer, Jeffamine® and carbon powder as a rheology modifier. In the formulation of some composites, Shell 360 was used in place of petroleum naphtha. The amounts of each component of the composite formulation are shown in Table 2. The electrical conductivity of the composites was measured as described in Example 2 and the values obtained for surface and volume resistivities are shown in Table 2.

Example 5

Preparation of Hytrel 5526 and Polyethyl Oxazoline-Carbon Composites

The procedure of Example 4 was repeated substituting Hytrel 5526 for Nylon 12. The electrical conductivity of the composite was measured as described in Example 2 and the values obtained for surface and volume resistivities are shown in Table 2.

Example 6

Preparation of Nylon 6 and Polyethyl Oxazoline-Carbon Composites

The procedure of Example 4 was repeated substituting Nylon 6 for Nylon 12. The electrical conductivity of the composite was measured as described in Example 2 and the values obtained for surface and volume resistivities are shown in Table 2.

Example 7

Preparation of Styrene and Polyethyl Oxazoline-Carbon Composites

The procedure of Example 4 was repeated substituting styrene for Nylon 12. The electrical conductivity of the composite was measured and the values obtained for surface and volume resistivities are shown in Table 2.

TABLE 1

FORMULATION AND RESISTIVITIES OF NYLON 12 AND POLYTHIOETHER-CARBON COMPOSITES WITH AND WITHOUT A CONDUCTIVE POLYMER

| Sample #D25 13024- | Nylon 12[1] (g) | Carbon (Cabot XC72R) (g) | Polymer (g) | Conductive Amine (g) | Polymer (g) | Resistivity OHM/SQ Surface | OHMs CM Volume |
|---|---|---|---|---|---|---|---|
| 3 | 49 | 1.0 | — | | | | |
| 4 | 39.84 | 0.16 | — | | | $6.3 \times 10^{15}$ | $1.2 \times 10^{15}$ |
| 5 | 39.84 | 0.16 | 3.98 Copolymer 1[2] | | | $2.5 \times 10^{13}$ | $6.9 \times 10^{14}$ |
| 6 | 39.84 | 0.16 | 3.98 Copolymer 2[2] | | | $6.3 \times 10^{12}$ | $9.3 \times 10^{13}$ |
| 7 | 20.0 | — | — | | | $6.3 \times 10^{12}$ | $7.7 \times 10^{14}$ |
| 8 | 39.84 | — | 3.98 Copolymer 2 | | | $6.3 \times 10^{12}$ | $1.3 \times 10^{15}$ |
| 9 | 39.84 | 0.16 | 7.96 Copolymer 2 | | | $6.3 \times 10^{12}$ | $4.5 \times 10^{13}$ |
| 10 | 39.84 | — | 3.98 Permapol ® P-855 | | | $1.0 \times 10^{16}$ | $3.5 \times 10^{14}$ |
| 11 | 39.84 | 0.8 | 3.98 Permapol ® P-855 | | | $2.3 \times 10^{15}$ | $7.2 \times 10^{15}$ |
| 12 | 40.0 | 4.0 | — | | | $2.3 \times 10^{15}$ | $7.9 \times 10^{14}$ |
| 13 | 40.0 | 4.0 | 4.0 Permapol ® P-855 | | | $4.0 \times 10^{16}$ | $5.7 \times 10^{14}$ |
| 17 | 40.0 | 0.8 | — | 4.0 JA[3] ED2001 | | $4.0 \times 10^{8}$ | $1.1 \times 10^{12}$ |
| 18 | 40.0 | — | 4.0 Polybrene ® | | | $1.3 \times 10^{11}$ | $2.9 \times 10^{12}$ |
| 19 | 40.0 | 0.8 | — | 8.0 JA ED2001 | | $2.5 \times 10^{9}$ | $1.7 \times 10^{11}$ |
| 20 | 40.0 | 0.8 | — | — | 8.0 Polypyrrole | $2.5 \times 10^{15}$ | $1.3 \times 10^{14}$ |
| 21 | 40.0 | 0.8 | — | 4.0 JA ED2001 | 8.0 Polypyrrole | $2.5 \times 10^{15}$ | $1.3 \times 10^{14}$ |
| 22 | 40.0 | 0.8 | — | 4.0 JA ED6000 | | $2.5 \times 10^{10}$ | $4.6 \times 10^{12}$ |
| 23 | 40.0 | 0.8 | — | 8.0 JA ED6000 | | $4.0 \times 10^{9}$ | $1.9 \times 10^{12}$ |
| 24[4] | — | 10.0 | — | 30.0 JA ED2001 | | | |
| 25 | 40.0 | 2.7 (24) | —> | 8.0 JA ED6000 | | $2.5 \times 10^{11}$ | $1.6 \times 10^{12}$ |
| 26 | 40.0 | 10.7 (24) + 5.3 UT[5] | —> | 8.0 JA ED2001 | | $8.0 \times 10^{9}$ | $7.6 \times 10^{10}$ |

TABLE 1-continued

FORMULATION AND RESISTIVITIES OF NYLON 12 AND POLYTHIOETHER-CARBON COMPOSITES WITH AND WITHOUT A CONDUCTIVE POLYMER

| Sample #D25 13024- | Nylon 12[1] (g) | Carbon (Cabot XC72R) (g) | Conductive Polymer (g) | Amine (g) | Polymer (g) | Resistivity OHM/SQ Surface | Resistivity OHMs CM Volume |
|---|---|---|---|---|---|---|---|
| 27[6] | — | 25.0 | — | 0.25 ODA[8] | | | |
| 28 | 40.0 | 4.0 (27) | — | 4.0 JA ED2001 | | $6.3 \times 10^9$ | $2.7 \times 10^2$ |
| 29 | 40.0 | 8.0 (27) | — | 4.0 JA ED2001 | | $8.0 \times 10^{11}$ | $1.3 \times 10^{12}$ |
| 30 | 40.0 | 16.0 (24) | — | 5.0 JA ED2001 | | $4.0 \times 10^{10}$ | $1.4 \times 10^{12}$ |
| 31 | 40.0 | 8.05 (24) + 7.95 UT | — | 2.0 JA ED2001 | | $4.0 \times 10^4$ | $3.7 \times 10^6$ |
| 32 | 48.0 | 4.0 (24) + 4.0 UT | — | 1.0 JA ED2001 | | $2.5 \times 10^{15}$ | $6.8 \times 10^{12}$ |
| 33 | 48.0 | 4.0 (24) + 4.0 UT | | JA ED2001 (24A) | | $1.6 \times 10^{10}$ | $1.7 \times 10^{10}$ |

[1] Unless otherwise noted.
[2] The structures of copolymers 1 and 2 are

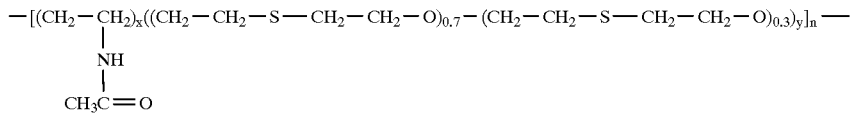

, synthesized from a polythioether with a MW = 500 or 1000, respectively.
[3] Jeffamine ®.
[4] Cabot Carbon XC72R was treated by stirring with Jeffamine ® ED2001 at 200° C. for 2 hr. Water was then removed with a Stark trap. The treated Carbon XC72R was cooled and the solvent removed with a Roto-vac. Final solvent removal was effected by heating the sample in a vacuum oven at 100–110° C. Samples thus treated were used in subsequent experiments as indicated by the sample numbers in parenthesis.
[5] Untreated.
[6] Cabot Carbon XC72R was treated in a manner similar to sample 13024-24 except that the solvent was Union Oil E (375 g).
[7] Octadecylamine

TABLE 2

FORMULATION AND RESISTIVITIES OF NYLON 12 AND POLYMER-CARBON COMPOSITES

| Sample ID | Nylon 12[1] (g) | Carbon (Cabot XC72R) (g) | Dispersing Polymer (g) | Plasticizer (g) | Rheology Modifier (g) | Solvent (ml) | Resistivity OHM/SQ Surface | Resistivity OHMs CM Volume |
|---|---|---|---|---|---|---|---|---|
| 1 | 36.0 | 8.96 Dried | 3.63 PEOX 50[2] | 1.81 JA[3] ED 2001 | | | $8.0 \times 10^4$ | $2.3 \times 10^6$ |
| 2 | 36.0 | 7.96 Dried | 3.63 PEOX 50 | 1.81 JA ED 2001 | | | $4.0 \times 10^4$ | $4.2 \times 10^6$ |
| 3 | 36.0 | 6.96 Dried | 3.63 PEOX 50 | 1.81 JA ED 2001 | | | $4.0 \times 10^{12}$ | $1.4 \times 10^{13}$ |
| 4 | 36.0 | 5.96 Dried | 3.63 PEOX 50 | 1.81 JA ED 2001 | | | $4.0 \times 10^5$ | $1.4 \times 10^7$ |
| 5 | 36.0 | 6.96 Dried | 3.63 PEOX 50 | 1.81 JA ED 2001 | | | $6.3 \times 10^4$ | $5.3 \times 10^5$ |
| 6 | 36.0 | 8.96 Dried | 3.63 PEOX 50 | 1.81 JA ED 2001 | 0.50 NMP[4] | | — | $2.1 \times 10^7$ |

TABLE 2-continued

FORMULATION AND RESISTIVITIES OF NYLON 12 AND POLYMER-CARBON COMPOSITES

| Sample ID | Nylon 12[1] (g) | Carbon (Cabot XC72R) (g) | Dispersing Polymer (g) | Plasticizer (g) | Rheology Modifier (g) | Solvent (ml) | Resistivity OHM/SQ Surface | Resistivity OHMs CM Volume |
|---|---|---|---|---|---|---|---|---|
| 7 | 42.5 | 8.96 Dried | — | — | 0.52 NMP | | $6.3 \times 10^{11}$ | — |
| 8 | 36.0 | 5.96 Dried | 3.63 PEOX 50 | 1.81 JA ED 2001 | 0.47 NMP | | $2.5 \times 10^{6}$ | $2.8 \times 10^{7}$ |
| 9 | 50.0 | 12.41 Dried | 4.91 PEOX 50 | 2.51 JA ED 2001 | | | $6.3 \times 10^{5}$ | $1.7 \times 10^{6}$ |
| 10 | 50.0 | 12.45 Dried | 4.91 PEOX 50 | 2.51 JA ED 2001 | 0.70 NMP | | $6.3 \times 10^{5}$ | $4.2 \times 10^{5}$ |
| 11 | 50.0 | 6.96 Dried | 4.91 PEOX 50 | 2.51 JA ED 2001 | 0.64 NMP | | $2.5 \times 10^{6}$ | $4.2 \times 10^{9}$ |
| 12 | 50.0 | 12.41 Dried | 4.91 PEOX 50 | — | 0.67 NMP | | $2.5 \times 10^{4}$ | $4.1 \times 10^{6}$ |
| 13 | 50.0 | 6.45 Dried | 3.91 PEOX 50 | 2.51 JA ED 2001 | 0.63 NMP | | $3.2 \times 10^{8}$ | $2.9 \times 10^{8}$ |
| 14 | 50.0 | 6.45 Dried | 3.91 PEOX 50 | — | 0.60 NMP | | $4.0 \times 10^{8}$ | $4.2 \times 10^{8}$ |
| 15 | 50.0 | 6.45 Dried | 3.91 PEOX 50 | — | 0.60 TBP[5] | | $2.5 \times 10^{15}$ | $2.9 \times 10^{12}$ |
| 16[6] | — | 10.0 | 20.0 PEOX 50 | | | 300 Shell 360 | | |
| 17 | 40.0 | 8.1 (16) + 7.9 UT[7] | — | 2.0 JA ED 2001 | | | $1.6 \times 10^{4}$ | $2.2 \times 10^{6}$ |
| 18 | 36.0 | 7.2 (16) + 5.2 UT | | 1.8 JA ED 2001 | | | $4.0 \times 10^{15}$ | $4.4 \times 10^{13}$ |
| 19[8] | — | 10.0 Dried | 30 PEOX 50 | | | 300 Shell 360 | | |
| 20 | 36.0 | — | 14.4 (19) | | | | $3.2 \times 10^{15}$ | $1.1 \times 10^{15}$ |
| 21 | 36.0 | 7.2 Dried | | | | | $2.5 \times 10^{5}$ | $1.8 \times 10^{6}$ |
| 22 | 36.0 | 5.0 Dried | 7.2 (19) | | | | $3.2 \times 10^{15}$ | $4.2 \times 10^{14}$ |
| 23 | 36.0 | 5.5 Dried | 7.2 (19) | | | | $3.2 \times 10^{15}$ | $4.1 \times 10^{13}$ |
| 24 | 36.0 | 6.0 Dried | 7.2 (19) | | | | $3.2 \times 10^{15}$ | $4.2 \times 10^{13}$ |
| 25 | 36.0 | 6.6 Dried | 7.2 (18) | | | | $3.2 \times 10^{15}$ | $4.2 \times 10^{13}$ |
| 26 | 36.0 | 7.2 Dried | 7.2 (18) | | | | $1.3 \times 10^{12}$ | $8.8 \times 10^{12}$ |
| 27 | 36.0 | 7.7 Dried | 7.2 (18) | | | | $3.2 \times 10^{15}$ | $4.1 \times 10^{13}$ |
| 28 | 36.0 | 9.6 Dried | 4.8 PEOX 50 | | | | $3.2 \times 10^{15}$ | $8.2 \times 10^{12}$ |
| 29 | 36.0 Hytrel 5526 | 7.15 Dried | 7.2 (16) | 1.8 JA ED2001 | | | $2.5 \times 10^{4}$ | $4.5 \times 10^{5}$ |
| 30 | 36.0 Nylon 6 | 7.15 Dried | 7.25 (16) | 1.8 JA ED2001 | | | — | — |
| 31 | 36.0 Styrene | 7.25 Dried | 7.25 (16) | 1.8 JA ED2001 | | | $8.0 \times 10^{4}$ | $3.0 \times 10^{6}$ |
| 32 | 36.0 | 7.15 Dried | 7.25 (16) | 1.8 JA ED2001 | | | $8.0 \times 10^{11}$ | $1.2 \times 10^{14}$ |
| 33 | 40.0 Nylon 6 | 0.5 Not Dried | 4.0 Silicone Rubber 7720 | | | | $2.5 \times 10^{15}$ | $3.0 \times 10^{14}$ |
| 34 | 40.0 Nylon 6 | | 4.0 TFPS[9] | | | | — | — |

TABLE 2-continued

FORMULATION AND RESISTIVITIES OF NYLON 12 AND POLYMER-CARBON COMPOSITES

| Sample ID | Nylon 12[1] (g) | Carbon (Cabot XC72R) (g) | Dispersing Polymer (g) | Plasticizer (g) | Rheology Modifier (g) | Solvent (ml) | Resistivity OHM/SQ Surface | Resistivity OHMs CM Volume |
|---|---|---|---|---|---|---|---|---|
| 35 | 36.0 | 8.15 Dried | 6.25 (5) | | | | $2.5 \times 10^{15}$ | $4.2 \times 10^{13}$ |
| 38 | 36.0 | 8.86 Dried | 3.63 PEOX 50 | 1.8 JA ED2001 | | | $8.0 \times 10^{4}$ | $2.3 \times 10^{6}$ |
| 40 | 36.0 | 10.77 Dried | 3.63 PEOX 50 | | | | $1.6 \times 10^{4}$ | $2.1 \times 10^{6}$ |
| 41 | 36.0 | 8.86 Undried Carbon | 3.63 PEOX 50 | 1.8 JA ED2001 | | | $1.6 \times 10^{4}$ | $1.7 \times 10^{6}$ |
| 42 | 37.8 | 8.86 Dried | 3.63 PEOX 50 | | | | $4.0 \times 10^{6}$ | $4.2 \times 10^{6}$ |
| 43 | 39.6 | 8.86 Dried | — | 1.81 JA ED 2001 | | | $8.0 \times 10^{11}$ | $1.3 \times 10^{12}$ |
| 44 | 36.0 | 8.86 Dried | 2.5 PEOX 50 | | | | $4.0 \times 10^{5}$ | $1.7 \times 10^{7}$ |
| 47 | 36.0 | 8.86 Dried | 1.81 PEOX 50 | | | | $1.6 \times 10^{10}$ | $2.8 \times 10^{10}$ |

[1]Unless otherwise noted.
[2]Polyethyl oxazoline (MW = 50,000).
[3]Jeffamine ®.
[4]N-methyl pyrrolidone
[5]Tributylphosphate.
[6]Treated as in sample no. 13024-24 (see, Table 1)
[7]Untreated.
[8]Treated as in sample no. 13024-24 (see, Table 1)
[9]Trifluoropropyl siloxane.

Example 8

Preparation of Nylon 6 and Silicon Rubber-Carbon Composites

The procedure of Example 4 was repeated substituting Nylon 6 for Nylon 12 and silicon rubber 7720 for polyethyl oxazoline. The electrical conductivity of the composite was measured as described in Example 2 and the values obtained for surface and volume resistivities are shown in Table 2.

Example 9

Preparation of Nylon 6 and Trifluoropropyl Siloxane-Carbon Composites

The procedure of Example 4 was repeated substituting Nylon 6 for Nylon 12 and trifluoropropyl siloxane for polyethyl oxazoline. The electrical conductivity of the composite was measured as described in Example 2 and the values obtained for surface and volume resistivities are shown in Table 2.

Example 10

Fabrication of Carbon/Nylon-12 Based Electromagnetic Radiation Absorbing Device

Multilayer Perforated Electrical Absorber with Same Perforation Size and Periodicity Configuration 1: A multilayer absorbing device having five layers was fabricated in the form of a 12"×12" tile based on results of the SLAB computer program using blends of carbon/nylon-12 provided in Tables 1 and 2. The composition and design of the absorbing device is given in Table 3. The absorption performance of this tile was measured in an anechoic chamber using standard techniques. This absorbing device provided an average of 5 to 7 dB absorption in 2 to 18 GHz range.

Configuration 2: In order to enhance the absorption performance of the absorbing device fabricated with configuration 1, the dielectric constant of the first (impedance matching) layer was decreased by using porous polypropylene foam filled with 5% carbon paint. The configuration of this absorbing device is given in Table 4. The absorption performance of this tile was measured in an anechoic chamber. This absorbing device provided an average of 12 to 20 dB absorption in the range of 7 to 18 GHz and an average of 10 dB absorption in the 2 to 7 GHz range.

TABLE 3

CONFIGURATION 1

| LAYER | COMPOSITION | THICKNESS | HOLE SIZE | PERIODICITY |
|---|---|---|---|---|
| 1st | 9% Carbon | 1 cm | 0.4 cm | 1 × 1 cm |
| 2nd | 9% Carbon | 1 cm | 0.4 cm | 1 × 1 cm |
| 3rd | 13% Carbon | 1 cm | 0.4 cm | 1 × 1 cm |
| 4th | 13% Carbon | 1 cm | 0.4 cm | 1 × 1 cm |
| 5th | 17% Carbon | 1 cm | 0.4 cm | 1 × 1 cm |
| Metal | | | | |

TABLE 4

CONFIGURATION 2

| LAYER | COMPOSITION | THICKNESS | HOLE SIZE | PERIODICITY |
|---|---|---|---|---|
| 1st | Porous polypropylene (5% carbon) | 1 cm | 0.0 cm | — |
| 2nd | 9% Carbon | 1 cm | 0.4 cm | 1 × 1 cm |
| 3rd | 13% Carbon | 1 cm | 0.4 cm | 1 × 1 cm |
| 4th | 13% Carbon | 1 cm | 0.4 cm | 1 × 1 cm |
| 5th | 17% Carbon | 1 cm | 0.4 cm | 1 × 1 cm |
| Metal | | | | |

Example 11

Fabrication of carbon/Nylon-12 Based Electromagnetic Radiation Absorbing Device

Multilayer Perforated Electrical Absorbing Device with Tapered Perforations

A multilayer absorbing device with the layer arrangement similar to configuration 3 was fabricated in the form of a 12"×12" tile with tapered perforations, the size of which was optimized by computer calculations using SLAB. The configuration of this absorbing device is provided in Table 5. The absorption performance of this tile was measured in an anechoic chamber. This absorbing device provided an average of 10 to 20 dB absorption in the range of 6 to 18 GHZ. The absorption in the range of 2 to 6 GHz was 5 to 10 dB.

TABLE 5

| LAYER | COMPOSITION | THICKNESS | HOLE SIZE | PERIODICITY |
|---|---|---|---|---|
| 1st | 9% Carbon | 1 cm | 1.75 cm | 2.5 × 2.5 cm |
| 2nd | 9% Carbon | 1 cm | 1.35 cm | 2.5 × 2.5 cm |
| 3rd | 13% Carbon | 1 cm | 1.00 cm | 2.5 × 2.5 cm |
| 4th | 13% Carbon | 1 cm | 0.65 cm | 2.5 × 2.5 cm |
| 5th | 17% Carbon | 1 cm | 0.40 cm | 2.5 × 2.5 cm |
| Metal | | | | |

Example 12

Fabrication of Carbon/Nylon-12 Based Electromagnetic Radiation Absorbing Device

Multilayer Perforated Electrical Absorbing Device with Tapered Perforations

A multilayer absorbing device with the layer arrangement similar to that shown in Example 11 was fabricated in the form of a 12"×12" tile with the sequence of the 2nd, 3rd, 4th, 5th and 6th layers reversed. The dielectric constant of the first (impedance matching) layer was decreased by using porous polypropylene foam filled with 5% carbon paint. The configuration of this absorbing device is provided in Table 6. The absorption performance of this tile was measured in an anechoic chamber. This absorbing device provided an average of 15 to 20 dB absorption in the range of 7 to 18 GHz. The absorption in the range of 2 to 7 GHz was 10 to 12 dB.

TABLE 6

| LAYER | COMPOSITION | THICKNESS | HOLE SIZE | PERIODICITY |
|---|---|---|---|---|
| 1st | Porous Polypropylene (5% carbon) | 1 cm | — | — |
| 2nd | 17% Carbon | 1 cm | 0.40 cm | 2.5 × 2.5 cm |
| 3rd | 13% Carbon | 1 cm | 0.65 cm | 2.5 × 2.5 cm |
| 4th | 13% Carbon | 1 cm | 1.00 cm | 2.5 × 2.5 cm |
| 5th | 9% Carbon | 1 cm | 1.35 cm | 2.5 × 2.5 cm |
| 6th | 9% Carbon | 1 cm | 1.75 cm | 2.5 × 2.5 cm |
| Metal | | | | |

Example 13

Fabrication of Carbon/Nylon-12 Based Electromagnetic Radiation Absorbing Device

Multilayer Perforated Electrical Absorbing Device with Tapered Perforations, Different Periodicity A multilayer absorbing device with the layer arrangement similar to that shown in Example 11 was fabricated in the form of a 12"×12" tile with the dielectric constant of the first (impedance matching) layer decreased by substituting porous polypropylene foam filled with 5% carbon paint for the first 9% carbon blend layer. The configuration of this absorbing device is provided in Table 7. The absorption performance of this tile was measured in an anechoic chamber. This absorbing device provided an average of 15 to 25 dB absorption in the range of 12 to 18 GHz. The absorption in the range of 2 to 10 GHz was 10 to 12 dB.

TABLE 7

| LAYER | COMPOSITION | THICKNESS | HOLE SIZE | PERIODICITY |
|---|---|---|---|---|
| 1st | Porous Polypropylene (5% carbon) | 1 cm | — | — |
| 2nd | 9% Carbon | 1 cm | 1.35 cm | 2.5 × 2.5 cm |
| 3rd | 13% Carbon | 1 cm | 1.00 cm | 2.5 × 2.5 cm |
| 4th | 13% Carbon | 1 cm | 0.65 cm | 2.5 × 2.5 cm |
| 5th | 17% Carbon | 1 cm | 0.40 cm | 1 × 1 cm |
| Metal | | | | |

Example 14

Multilayered Magnetic Absorbing Device for SHF Band Homogeneous Ferrite Magnetic Layers A multilayer magnetic absorbing device was fabricated in the form of a 12"×12 " tile using BSF547/concrete, KN320/concrete and MAT305/concrete compositions as shown in Table 8. The absorption performance of this tile was measured in an anechoic chamber. This absorbing device provided an average of 10 to 15 dB absorption in the range of 7 to 18 GHz and an average of 7 dB in the range of 2 to 7 GHz.

TABLE 8

MULTILAYER MAGNETIC ABSORBING DEVICE

| LAYER | MAGNETIC ABSORBER/CONCRETE | THICKNESS |
|---|---|---|
| 1st | KN320 (30%)/Concrete | 0.8 cm |
| 2nd | MAT305 (30%)/Concrete | 0.8 cm |
| 3rd | BSF547 (30%)/Concrete | 0.8 cm |
| Metal | | |

Example 15

Mixed Ferrite Magnetic Absorbing Device for SHF Band

Mixtures of BSF547, KN320 and MAT305 with concrete were prepared as shown in Table 9 and fabricated into a 12×12×1.6 cm tile. The absorption performance of this tile was measured in an anechoic chamber. This tile provided an average of 12 to 20 dB absorption in the 8 to 18 GHz range.

TABLE 9

MIXED FERRITE MAGNETIC ABSORBING DEVICE

| COMPONENT | PERCENTAGE IN DRY BASE |
|---|---|
| Concrete | 70% |
| BSF 547 | 10% |
| MAT 305 | 10% |
| KN 320 | 10% |

Example 16

Magnetic/Electrical Composite Absorbing Device

An electromagnetic radiation absorbing device was fabricated as shown in Table 10. The porous polypropylene layer (first layer) was used to provide the impedance matching while the second layer was used with 1.75 cm hole size to provide low dielectric constant and high absorption. The third (Eccosorb SF 3.0, Emerson And Cummings) and fourth (Eccosorb SF 6.0, Emerson and Cummings) layers are commercially available narrow band ferrite absorbers and provide an average of 10 dB absorption in the range of 2 to 4 and 4 to 8 GHz, respectively. The fifth layer was prepared by mixing BSF547, KN320 and MAT305 ferrites with concrete. The size of this integrated absorbing device is 12 cm×12 cm×3.2 cm. The absorption performance of this tile was measured in an anechoic chamber. This absorbing device provided 15 dB absorption in the 2 to 18 GHz range.

TABLE 10

INTEGRATED ELECTRICAL-MAGNETIC ABSORBING DEVICE

| | Composition | Thickness | Hole Size | Periodicity |
|---|---|---|---|---|
| 1st layer (electrical) | porous polypropylene (5% carbon) | 1 cm | 0.0 cm | — |
| 2nd layer (electrical) | 17% carbon | 1 cm | 1.75 cm | 2.5 × 2.5 cm |
| 3rd layer (magnetic) | Eccosorb SF 3.0 | 0.19 cm | — | — |
| 4th layer (magnetic) | Eccosorb SF 6.0 | 0.22 cm | — | — |
| 5th layer (mixed ferrite) | BSF547, KN320 & MAT305 (80 g each) Concrete (800 g) | 0.8 cm | — | |
| Metal | | | | |

We claim:

1. An electromagnetic radiation absorbing device, having an outer, radiation-contacting surface and an inner surface, consisting of:

a metal plate having a first face and an opposing second face, the first face defining the inner surface of the device and adapted to be affixed to a target substrate;

a magnetic absorbing layer laminated to the second face of the metal plate;

an electrical absorbing layer laminated onto the magnetic absorbing layer, and containing a plurality of perforations which extend through the cross-section of the electrical absorbing layer; and optionally, an impedance matching layer laminated onto the electrical absorbing layer.

2. The electromagnetic radiation absorbing device of claim 1, wherein the electrical absorbing layer is comprised of a first polymeric material of a thermoplastic or thermoset resin and a second polymeric material which is a block copolymer comprising:

(a) a first block formulated from monomer units of the structure

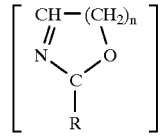

wherein n is 1 or 2, and R is a substituent selected from the group consisting of hydrogen and a $C_1$–$C_{40}$ side chain, wherein the side chain is a linear or branched aliphatic hydrocarbon radical optionally containing 1 to 3 ether, imine and/or sulfide linkages, an alicyclic or aromatic hydrocarbon radical, polyethylene imine, a polyethylene oxide, a polythioether or a thioether linkage-containing polyalkylene glycol; and (b) a second block comprising a thioether linkage-containing polyalkylene glycol.

3. The electromagnetic radiation absorbing device of claim 2, wherein the first polymeric material is selected from the group consisting of Nylon 12, polyester, polystyrene, silicone rubber, fluorinated elastomers and epoxies.

4. The electromagnetic radiation absorbing device of claim 3, wherein the electrical absorbing layer further includes a conductive material effective to provide the layer with a resistivity of less than about $10^{10}$ ohm.cm.

5. The electromagnetic radiation absorbing device of claim 4, wherein the conductive material is selected from the group consisting of carbon, conductive polymers, metal powders and metal fibers.

6. The electromagnetic radiation absorbing device of claim 5, wherein the conductive polymer is selected from the group consisting of polyanilines, polypyrroles and polythiophenes.

7. The electromagnetic radiation absorbing device of claim 1, wherein the electrical absorbing layer is comprised of a first polymeric material of a thermoplastic or thermoset resin and a second polymeric material which is a block copolymer comprising:

(a) a first block formulated from monomer units of the structure

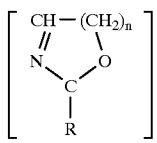

wherein n is 1 or 2, and R is a substituent selected from the group consisting of hydrogen and a $C_1$–$C_{40}$ side chain, wherein the side chain is a linear or branched aliphatic hydrocarbon radical optionally containing 1 to 3 ether, imine and/or sulfide linkages, an alicyclic or aromatic hydrocarbon radical, polyethylene imine, a polyethylene oxide or a polythioether; and (b) a second block formulated from monomer units of the structure

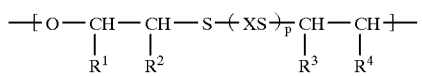

wherein $R^1$, $R^2$, $R^3$ and $R^4$ are independently selected from the group consisting of hydrogen, and lower alkyl, X is —$R^m$—$(Z)_l$—$R^n$— wherein $R^m$ and $R^n$ are branched or linear lower alkylene, Z is O or S, l is 0 or 1 and p is 0 or 1.

8. The electromagnetic radiation absorbing device of claim 7, wherein the first polymeric material is selected from the group consisting of Nylon 12, polyester, polystyrene, silicone rubber, fluorinated elastomers and epoxies.

9. The electromagnetic radiation absorbing device of claim 8, wherein the electrical absorbing layer further includes a conductive material effective to provide the layer with resistivity less than about $10^{10}$ ohm.cm.

10. The electromagnetic radiation absorbing device of claim 9, wherein the conductive material is selected from the group consisting of carbon, conductive polymers, metal powders and metal fibers.

11. The electromagnetic radiation absorbing device of claim 10, wherein the conductive polymer is selected from the group consisting of polyanilines, polypyrroles and polythiophenes.

12. The electromagnetic radiation absorbing device of claim 1, wherein the electrical absorbing layer is comprised of a first polymeric material of a thermoplastic or thermoset resin and a second polymeric material which is a polymer formulated from monomer units of the structure

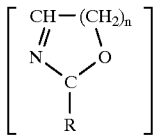

wherein n is 1 or 2, and R is selected from the group consisting of polyethylene imine, polyethylene oxide, polythioethers, thioether-linkage polyalkylene glycols, and combinations thereof.

13. The electromagnetic radiation absorbing device of claim 12, wherein the first polymeric material is selected from the group consisting of Nylon 12, polyester, polystyrene, silicone rubber, fluorinated elastomers and epoxies.

14. The electromagnetic radiation absorbing device of claim 13, wherein the electrical absorbing layer further includes a conductive material effective to provide the layer with resistivity less than about $10^{10}$ ohm.cm.

15. The electromagnetic radiation absorbing device of claim 14, wherein the conductive material is selected from the group consisting of carbon, conductive polymers, metal powders and metal fibers.

16. The electromagnetic radiation absorbing device of claim 15, wherein the conductive polymer is selected from the group consisting of polyanilines, polypyrroles and polythiophenes.

17. The electromagnetic radiation absorbing device of claim 1, wherein the electrical absorbing layer is comprised of first polymeric material of a thermoplastic or thermoset resin and a second polymeric material which is a copolymer formulated from a first monomeric unit having the structure

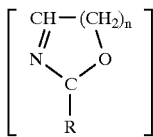

wherein n is 1 or 2, and R is a substituent selected from the group consisting of hydrogen and a $C_1$–$C_{40}$ side chain, wherein the side chain is a linear or branched aliphatic hydrocarbon radical optionally containing 1 to 3 ether, imine and/or sulfide linkages, or an alicyclic or aromatic hydrocarbon radical, and a second monomeric species comprising an amine-terminated polyethylene oxide.

18. The electromagnetic radiation absorbing device of claim 17, wherein the first polymeric material is selected from the group consisting of Nylon 12, polyester, polystyrene, silicone rubber, fluorinated elastomers and epoxies.

19. The electromagnetic radiation absorbing device of claim 18, wherein the electrical absorbing layer further includes a conductive material effective to provide the layer with resistivity less than about $10^{10}$ ohm.cm.

20. The electromagnetic radiation absorbing device of claim 19, wherein the conductive material is selected from the group consisting of carbon, conductive polymers, metal powders and metal fibers.

21. The electromagnetic radiation absorbing device of claim 20, wherein the conductive polymer is selected from the group consisting of polyanilines, polypyrroles and polythiophenes.

22. The electromagnetic radiation absorbing device of claim 1, wherein the perforations in the electrical absorbing layer are periodic perforations.

23. The electromagnetic radiation absorbing device of claim 1, wherein the magnetic absorbing layer is comprised of a ferrite-based composition.

24. The electromagnetic radiation absorbing device of claim 23, wherein the ferrite-based composition is selected from the group consisting of a homogeneous ferrite composition and a mixed ferrite composition, or combinations thereof.

25. The electromagnetic radiation absorbing device of claim 23, wherein the magnetic absorbing layer further includes concrete.

26. The electromagnetic radiation absorbing device of claim 1, wherein the impedance matching layer is comprised of a material selected from the group consisting of porous plastic, porous ceramic and porous concrete-type material.

27. The electromagnetic radiation absorbing device of claim 1, wherein the outer, radiation-contacting surface matching layer is provided with a ceramic coating.

28. An electromagnetic radiation absorbing device, having an outer, radiation-contacting surface and an inner surface, consisting of:
   a metal plate having a first face and a opposing second face, the first face defining the inner surface of the device, and adapted to be affixed to a target substrate;
   a magnetic absorbing layer laminated to the second face of the metal plate;
   a plurality of electrical absorbing layers laminated onto the magnetic absorbing layer, each electrical absorbing layer containing a plurality of perforations which extend through the cross-section of the layers; and,
   optionally, an impedance matching layer laminated onto the eletrical absorbing layer.

29. The electromagnetic radiation absorbing device of claim 28, wherein the perforations in each electrical absorbing layer are aligned.

30. The electromagnetic radiation absorbing device of claim 28, wherein the perforations in each electrical absorbing layer are offset.

31. The electromagnetic radiation absorbing device of claim 28, wherein the perforations in each electrical absorbing layer has the same cross-sectional area as the perforations in the remaining electrical absorbing layers.

32. The electromagnetic radiation absorbing device of claim 28, wherein the perforations in each electrical absorbing layer has a different cross-sectional area from the perforations in the remaining electrical absorbing layers.

33. The electromagnetic radiation absorbing device of claim 28, wherein the perforations in each electrical absorbing layer has the same cross-sectional shape as the perforations in the remaining electrical absorbing layers.

34. The electromagnetic radiation absorbing device of claim 28, wherein the perforations in each electrical absorbing layer has a different cross-sectional shape from the perforations in the remaining electrical absorbing layers.

35. The electromagnetic radiation absorbing device of claim 28, wherein the perforations in the electrical absorbing layers are periodic perforations.

36. The electromagnetic radiation absorbing device of claim 28, wherein the periodicity of the perforations in each electrical absorbing layer is the same as the periodicity in the remaining electrical absorbing layers.

37. The electromagnetic radiation absorbing device of claim 35, wherein the periodicity of the perforations in each electrical absorbing layer is different from the periodicity in the remaining electrical absorbing layers.

38. The electromagnetic radiation absorbing device of claim 28, wherein the electrical absorbing layers form a graded resistive structure.

39. An electromagnetic radiation absorbing device, having an outer, radiation-contacting surface and an inner surface, consisting of:
   a metal plate having a first face and an opposing second face, the first face defining the inner surface of the device adapted to be affixed to a target substrate;
   a plurality of magnetic absorbing layers laminated to the second face on the metal plate;
   an electrical absorbing layer laminated onto the magnetic absorbing layers, and containing a plurality of perforations which extend through the cross-section of the electrical absorbing layer; and
   optionally, an impedance matching layer laminated onto an electrical absorbing layer.

40. The electromagnetic radiation absorbing device of claim 39, wherein the magnetic layers are individually comprised of different homogeneous ferrite-based compositions.

41. The electromagnetic radiation absorbing device of claim 39, wherein one magnetic absorbing layer is comprised of a mixed ferrite-based composition.

42. The electromagnetic radiation absorbing device of claim 40, wherein the magnetic absorbing layers further include concrete.

43. The electromagnetic radiation absorbing device of claim 41, wherein the magnetic absorbing layer further includes concrete.

44. The electromagnetic radiation absorbing device of claim 43, wherein the impedance matching layer further includes carbon, wherein the carbon is present in an amount up to approximately 100%.

45. An electromagnetic radiation absorbing device, having an outer, radiation-containing surface and an inner surface, consisting of:
   a metal plate having a first face and an opposing second face, the first face defining the inner surface of the device and adapted to be affixed to a target substrate;
   a plurality of magnetic absorbing layers laminated to the second face of the metal plate;
   a plurality of electrical absorbing layers laminated onto the magnetic absorbing layers, each electrical absorbing layer containing a plurality of perforations which extend through the cross-section of the layers; and
   optionally, an impedance matching layer laminated onto the electrical absorbing layers.

* * * * *

UNITED STATES PATENT AND TRADEMARK OFFICE

CERTIFICATE OF CORRECTION

PATENT NO. : 5,976,666

DATED : November 2, 1999

INVENTOR(S) : Subhash C. Narang; Asutosh Nigam, Sei-ichi Yokoi; Robert C. Schmitt; Kenneth J. Harker; Mark A. McHenry It is certified that error appears in the above-identified patent and that said Letters Patent is hereby corrected as shown below:

On the title page, item:

"[73] Assignee: SRI International, Menlo Park, Calif." to --[73] Assignee: Takenaka Corporation, Osaka, Japan.--

Signed and Sealed this

Twelfth Day of December, 2000

Attest:

Q. TODD DICKINSON

*Attesting Officer*  *Director of Patents and Trademarks*